United States Patent [19]

Ogawa et al.

[11] Patent Number: 5,419,883
[45] Date of Patent: May 30, 1995

[54] LITHIUM ALUMINUM COMPLEX HYDROXIDE SALT AND PROCESS FOR PREPARATION THEREOF

[75] Inventors: Masahide Ogawa, Shibata; Kunio Goto, Tsuruoka; Shoji Shoji, Tsuruoka; Yoshinobu Komatsu, Tsuruoka; Akira Tatebe, Tsuruoka, all of Japan

[73] Assignee: Mizusawa Industrial Chemicals, Ltd., Tokyo, Japan

[21] Appl. No.: 213,037

[22] Filed: Mar. 15, 1994

Related U.S. Application Data

[63] Continuation-in-part of Ser. No. 994,955, Dec. 22, 1992, Pat. No. 5,356,567.

[30] Foreign Application Priority Data

Dec. 27, 1991 [JP] Japan ......................... 358208

[51] Int. Cl.$^6$ ..................... C01F 1/00; C01F 7/00; C01D 15/00
[52] U.S. Cl. ..................... 423/122; 423/127; 423/179.5; 423/184; 423/198; 252/400.1; 252/400.52; 252/400.62; 524/444
[58] Field of Search ............ 423/122, 127, 179.5, 423/184, 198, 202, 209; 252/400.1, 400.52, 400.62

[56] References Cited

U.S. PATENT DOCUMENTS 4,348,297 9/1982 Bauman et al. ............... 423/179.5

OTHER PUBLICATIONS

"Anion Intercalation and Exchange in Al(OH)$_3$-Derived Compounds" I. Sissoko et al. J. of Solid State Chemistry 60, pp. 283–288, 1985.
"Crystal–Chemical Study of Layered [Al$_2$Li(OH)$_6$]+X−·nH$_2$O" by Sema et al. Clays and Clay Minerals, vol. 30, No. 3, pp. 180–184, 1982.

Primary Examiner—Tae H. Yoon
Attorney, Agent, or Firm—Sherman and Shalloway

[57] ABSTRACT

An lithium aluminum complex hydroxide salt (LAHS) and a process for preparation thereof is provided. The LAHS is represented by the formula;

$$(Al_2Li(OH)_6)_n X, mH_2O$$

wherein X is an inorganic or organic anion, n is a value number of X, and m is a number of not more than 3, and having an orientation degree (OD) of not less than 10, OD being defined by the formula;

$$OD = I_{(002)}/I_{(110)}$$

wherein $I_{(002)}$ is a relative intensity of a peak in X-ray diffraction pattern with an index of a plane (002) appearing at a spacing (d) of 7.67 Å to 7.84 Å and $I_{(110)}$ is a relative intensity of a peak in X-ray pattern with an index of a plane (110) appearing at a spacing (d) of 4.41 Å to 4.45 Å. This LAHS is useful for a stabilizer for chlorine-containing polymers or olefin-type resins containing halogen-containing catalyst residues.

11 Claims, 22 Drawing Sheets

LITHIUM ALUMINUM COMPLEX HYDROXIDE SALT AND PROCESS FOR PREPARATION THEREOF

This application is a continuation-in-part of U.S. application Ser. No. 07/994,955 filed Dec. 22, 1992, has issued as U.S. Pat. No. 5,356,567 on Oct. 18, 1994.

BACKGROUND OF THE INVENTION

1. Field of the Invention

This invention relates to a lithium aluminum complex hydroxide salt (to be abbreviated as LAHS) and preparation thereof and more specifically, to a LAHS useful for a stabilizer having an excellent heat stabilizing action for chlorine-containing polymers or olefin-type resins containing halogen-containing catalyst residues.

2. Description of the Prior Art

Chlorine-containing polymers such as a vinyl chloride polymer are colored by a heat decomposition reaction such as dehydrochlorination or are liable to decrease in mechanical properties in a heat molding processing and heat histories subjected thereafter, and to prevent these defects, the compounding of stabilizers is generally necessary.

Olefin resins produced by using Ziegler-type catalysts contain halogen-containing catalyst residues, and these residues generate hydrogen chloride during a heat molding processing to form rusts in a molding machine, or cause deterioration of resins such as yellowing. To remedy these defects, it is widely practiced to incorporate stabilizers for capturing hydrogen chloride.

As such a stabilizer, the use of hydrotalcite has been known from old. For example, Japanese Laid-Open Patent Publication No. 80445/1980 describes the use of hydrotalcite as a stabilizer for halogen-containing resins. Furthermore, Japanese Patent Publication No. 36012/1983 describes the compounding of a β-diketone compound and a hydrotalcite represented by the following formula

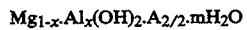

$$Mg_{1-x}Al_x(OH)_2 \cdot A_{2/2} \cdot mH_2O$$

wherein x is a number of $0 < x \leq 0.5$, A is $CO_3^{2-}$ or $SO_4^{2-}$, and m is a positive number,
in a halogen-containing resin.

Furthermore, Japanese Patent Publication No. 30737/1984 describes the compounding of at least 0.01% by weight of a complex compound having the general formula

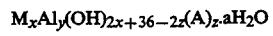

$$M_xAl_y(OH)_{2x+3y-2z}(A)_z \cdot aH_2O$$

wherein M is Mg, Ca or Zn, A is $CO_3$ or $HPO_4$, x, y and z are positive numbers, and a is zero or a positive number,
in a polyolefin containing halogen-containing catalyst residues produced by using Ziegler-type catalysts.

Hydrotalcites are complex hydroxide carbonate salts of magnesium and aluminum and non-toxic, have excellent thermal stability, and are characteristic in that they are transparent when incorporated in polymers.

Hydrotalcites ideally have a chemical composition represented by the following formula

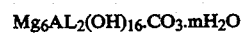

$$Mg_6Al_2(OH)_{16} \cdot CO_3 \cdot mH_2O$$

wherein m is zero or a positive number,
but Mg and Al within a broad range tend to form a solid solution as shown in the formula shown in the above prior arts cited above. It is difficult to produce a product having a fixed composition.

Clays and Clay Minerals, Vol. 25, pages 384 to 391 (1977) gives a thesis entitled "Crystal-Chemical Study of Layered $(Al_2Li(OH)_6)^+X^- \cdot nH_2O$" by C. J. Serna et al. which describes the synthesis of a lithium aluminum complex hydroxide salt by adding a benzene solution of aluminum-tri- (sec-butoxide) (ASB) dropwise to an excess of lithium carbonate aqueous solution to hydrolyze ASB, washing the resulting gel and hydrothermally treating it at 130° C. for several days. Journal of Solid State Chemistry, Vol. 60, pages 283–288 (1985) also gives a thesis entitled "Anion Intercalation and Exchange in $Al(OH)_3$—Derived Compounds" by I, Sissoko et al. which describes the formation of LAHS by adding $AlCl_3$ dropwise to an aqueous solution containing LiOH and $Na_2CO_3$, changing the pH from 13 in the early period to 10.2 in the final period to form a gel-like precipitate, and ripening it with stirring (see Comparative Example 1 which appears later).

However, LAHS synthesized by these known methods is a gel-like particle and the growth of the crystal is still insufficient. In addition, the shape and size of the particle are irregular, and the resulting LAHS is still insufficient for application of compounding agents to resins.

SUMMARY OF THE INVENTION

The present inventors have found that when lithium carbonate and aluminum chloride are reacted in the copresence of sodium carbonate and sodium hydroxide and after the reaction, a higher fatty acid is added to the reaction mixture, the crystals of the resulting lithium aluminum complex hydroxide salt are well grown and their particle shape and particle size become regular.

According to the present invention there is provided a lithium aluminum complex hydroxide salt represented by the following formula $$(Al_2Li(OH)_6)_nX \cdot mH_2O \qquad (1)$$

wherein X is an inorganic or organic anion, n is a value number of anion X, and m is a number of not more than 3,
and having an orientation degree (OD) of no less than 10, said orientation degree (OD) being defined by the following formula;

$$OD = I_{(002)}/I_{(110)} \qquad (2)$$

wherein $I_{(002)}$ is a relative intensity of a peak in X-ray (Cu-Kα) diffraction pattern with an index of a plane (002) appearing at a spacing (d) of 7.67 Å to 7.84 Å and $I_{(110)}$ is a relative intensity of a peak in X-ray (Cu-Kα) diffraction pattern with an index of a plane (110) appearing at a spacing (d) of 4.41 Å to 4.45 Å.

According to the invention, there is also provided a process for preparation of a lithium aluminum complex hydroxide salt, which comprises reacting lithium carbonate with aluminum chloride in the presence of sodium carbonate and sodium hydroxide, and then carrying out a surface-treatment reaction by adding a fatty acid to the reaction mixture while stirring.

DETAILED DESCRIPTION OF PREFERRED EMBODIMENTS

The lithium aluminum complex hydroxide salt is formed by getting a lithium ion into a vacant site of an aluminum hydroxide octahedron layer of the gibbosity structure and combining an anion to fill up the electric charge. The lithium ion has the smallest ion radius among cations. Since as a monovalent ion, the lithium ion is exceptionally a hexacoordinate ion, it enters the above vacant site and is considered to take the above structure.

LAHS has a layer structure and shows ion exchangeability with respect to an anion. Thus, since it shows structure and properties similar to hydrotalcite, LAHS is called a hydrotalcite-like compound or lithium hydrotalcite. Since hydrotalcite is obtained by isomorphous-substituting a part of magnesium of the brucite structure with aluminum, LAHS and hydrotalcite are quite different in chemical composition and structure.

Figure 1:
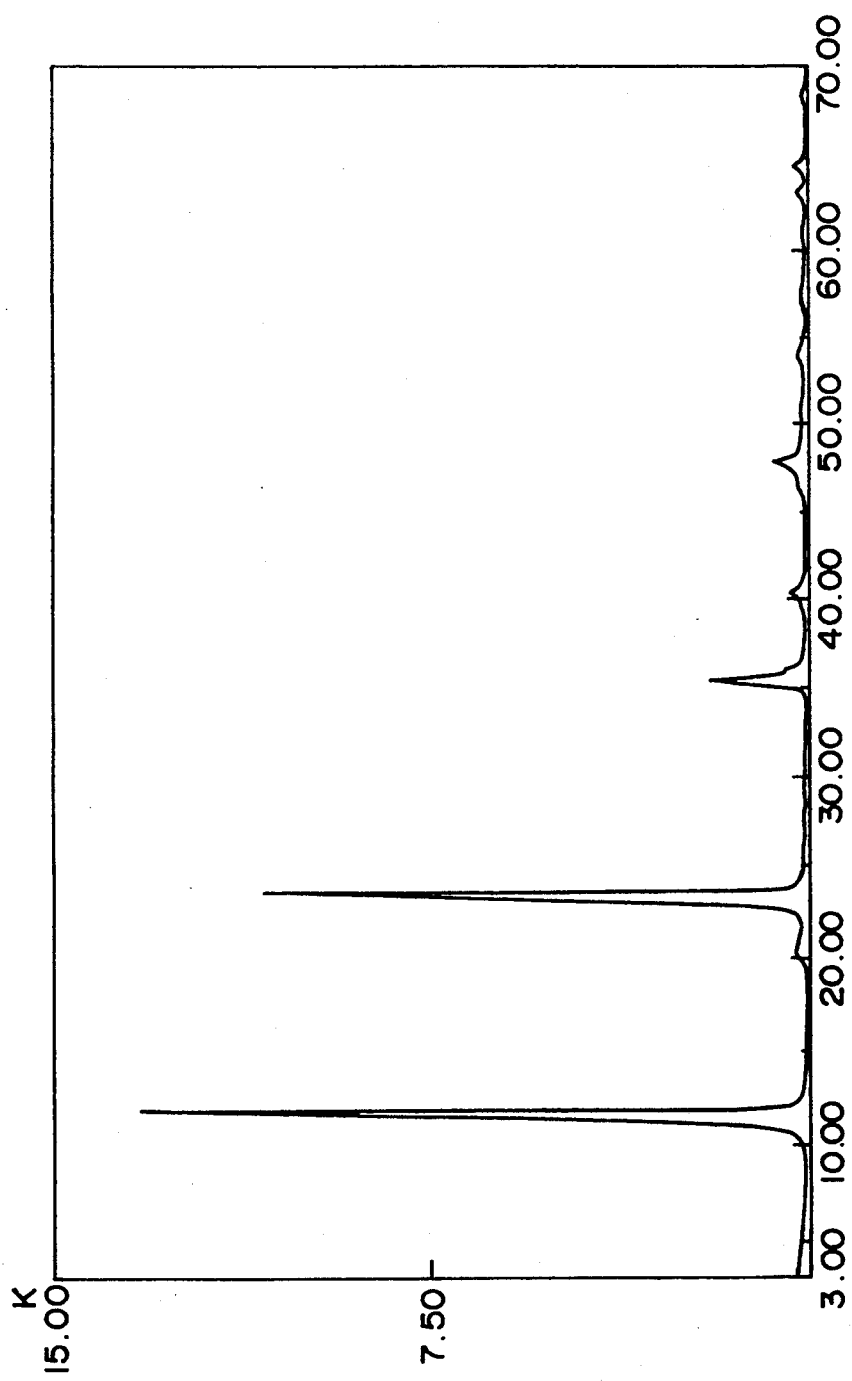
FIG. 1 is an X-ray diffraction pattern under Cu-Kα rays of LAHS (Sample No. 1) obtained in Example 1 of the specification of the present invention.
Figure 2:
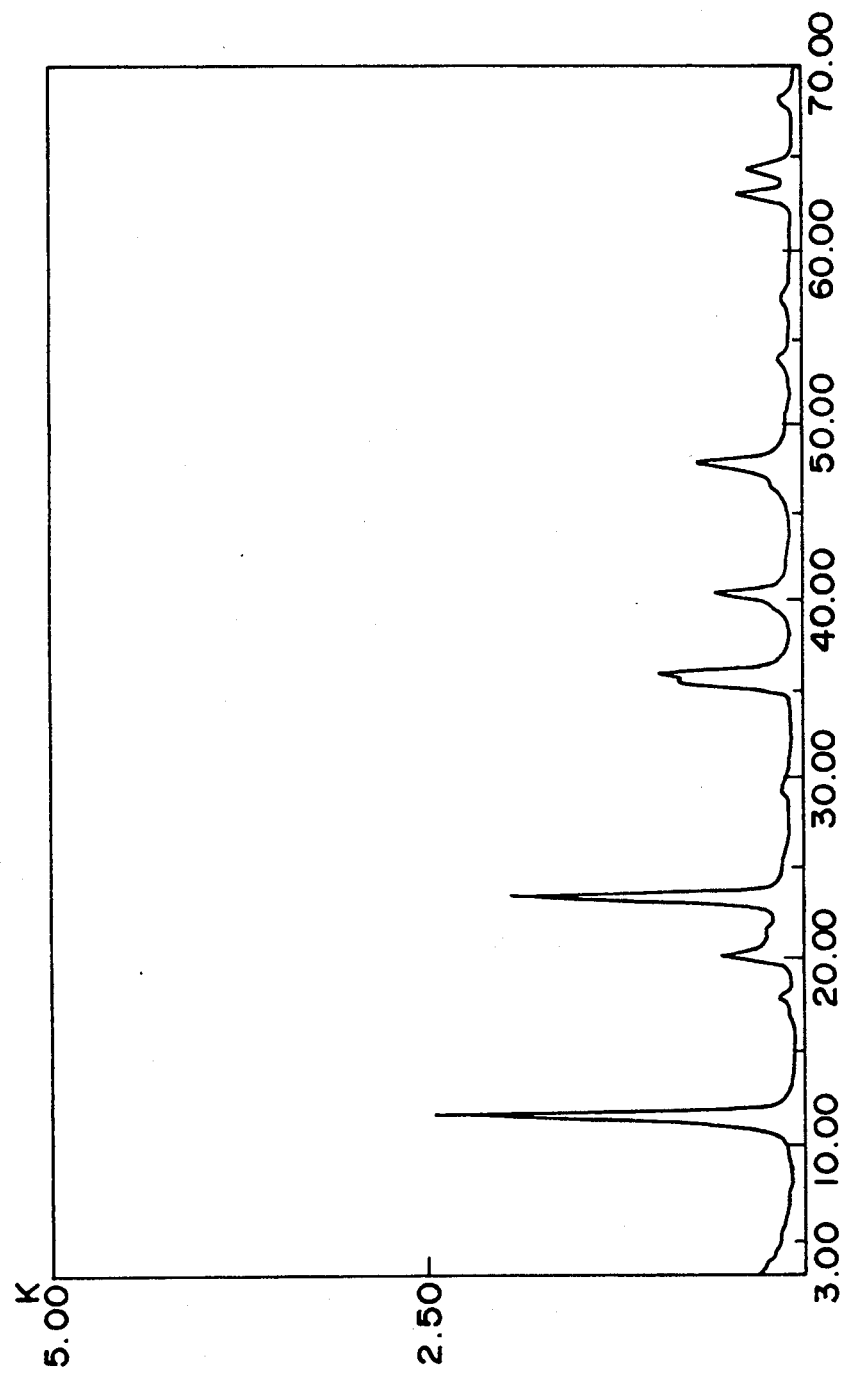
FIG. 2 is an X-ray diffraction pattern under Cu-Kα rays of LAHS (Sample No. H-1) obtained in Comparative Example 1.
Figure 3:
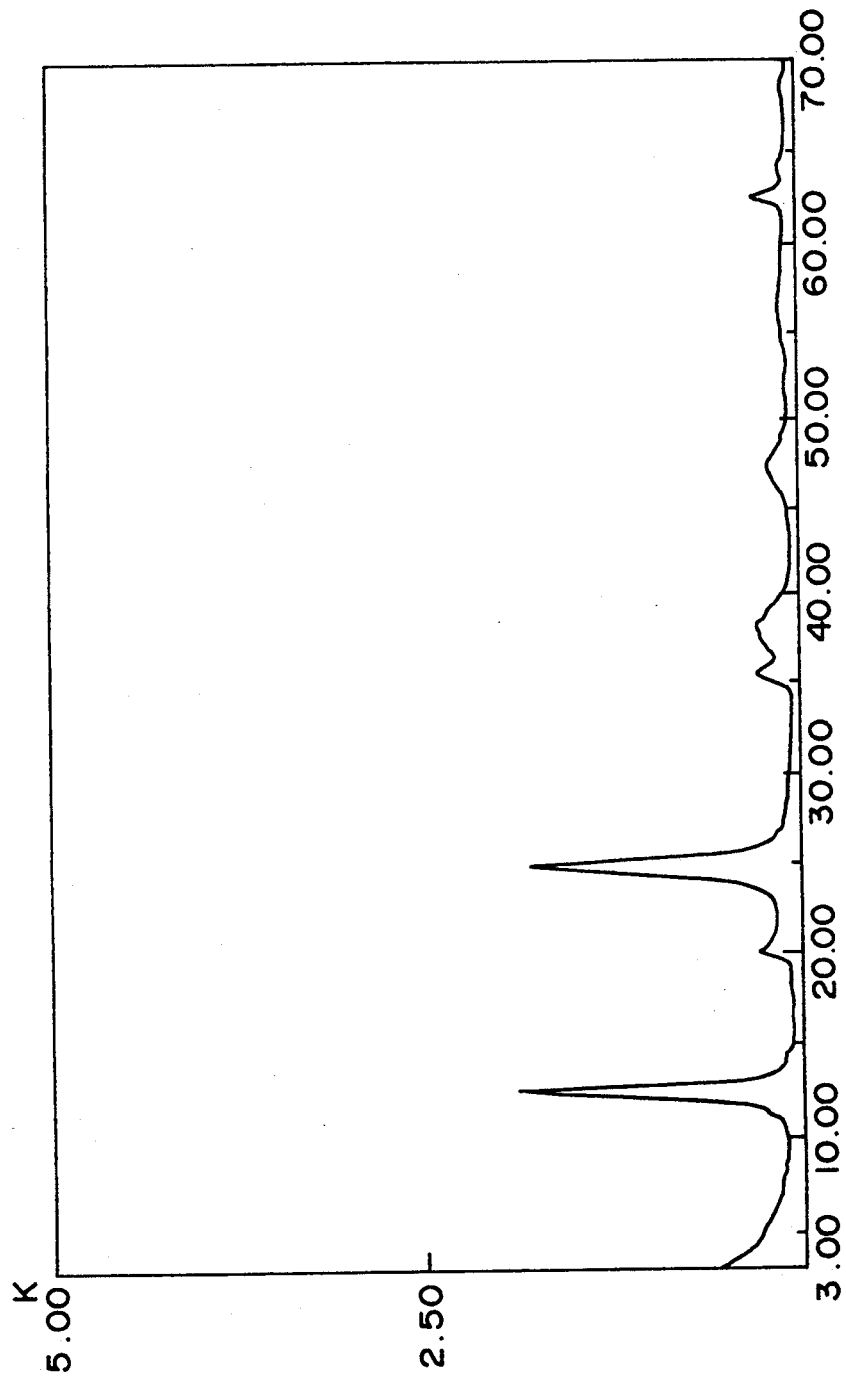
FIG. 3 is an X-ray diffraction pattern under Cu-Kα rays of LAHS (Sample No. H-2) obtained in Comparative Example 2.
Figure 4:
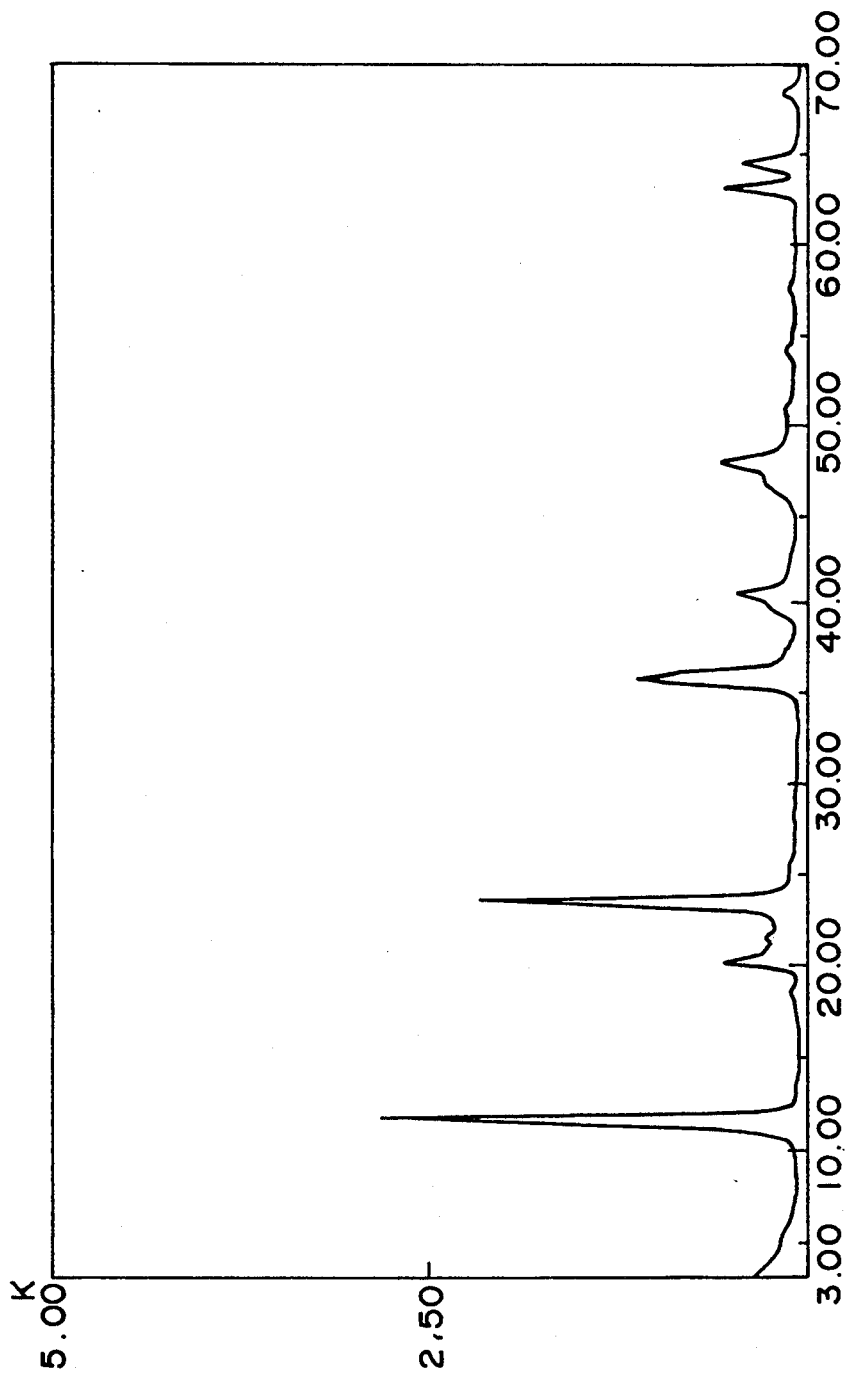
FIG. 4 is an X-ray diffraction pattern under Cu-Kα rays of LAHS (Sample No. H-3) obtained in Comparative Example 3.
Figure 5:
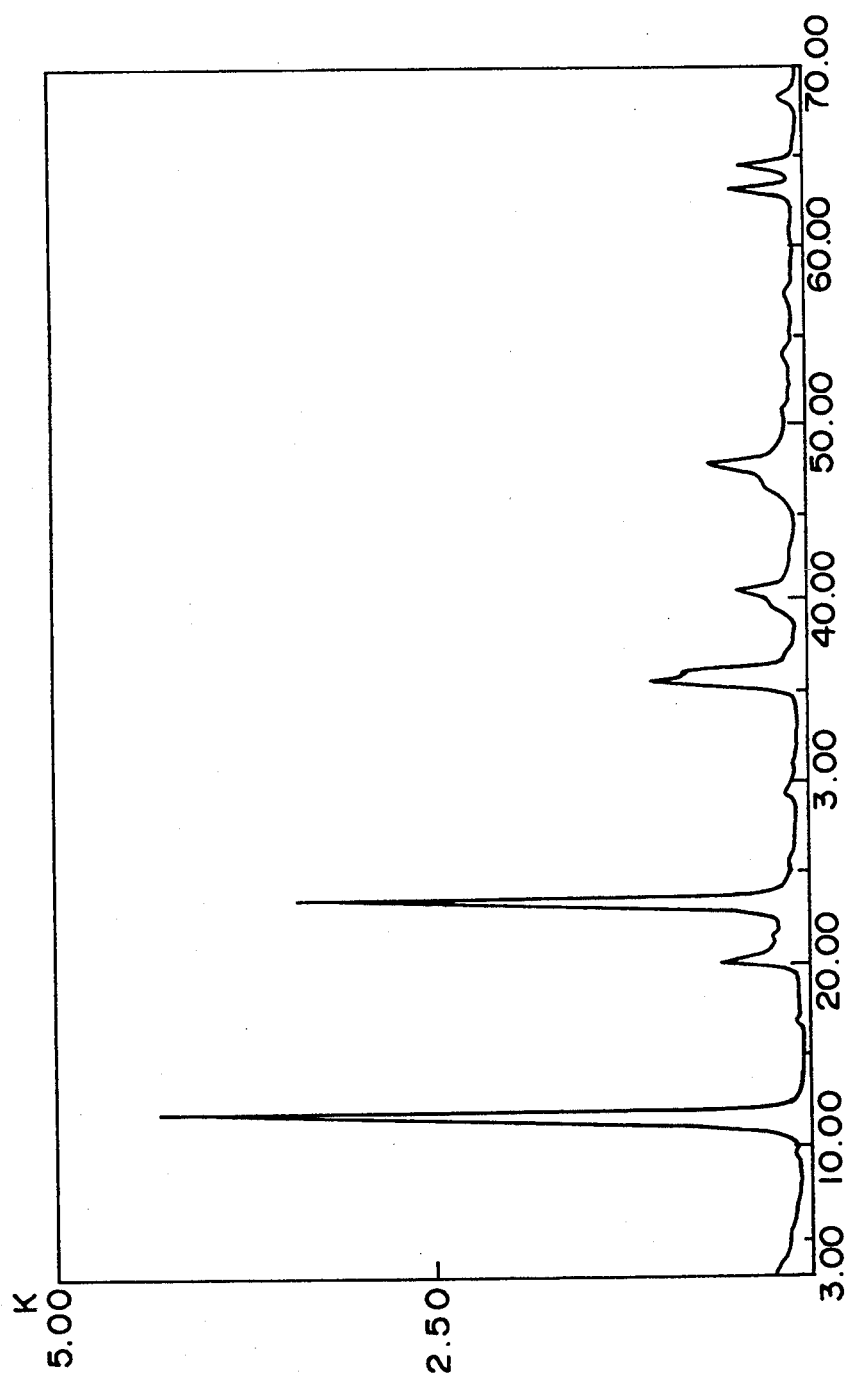
FIG. 5 is an X-ray diffraction pattern under Cu-Kα rays of LAHS (Sample No. H-4) obtained in Comparative Example 4.
Figure 6:
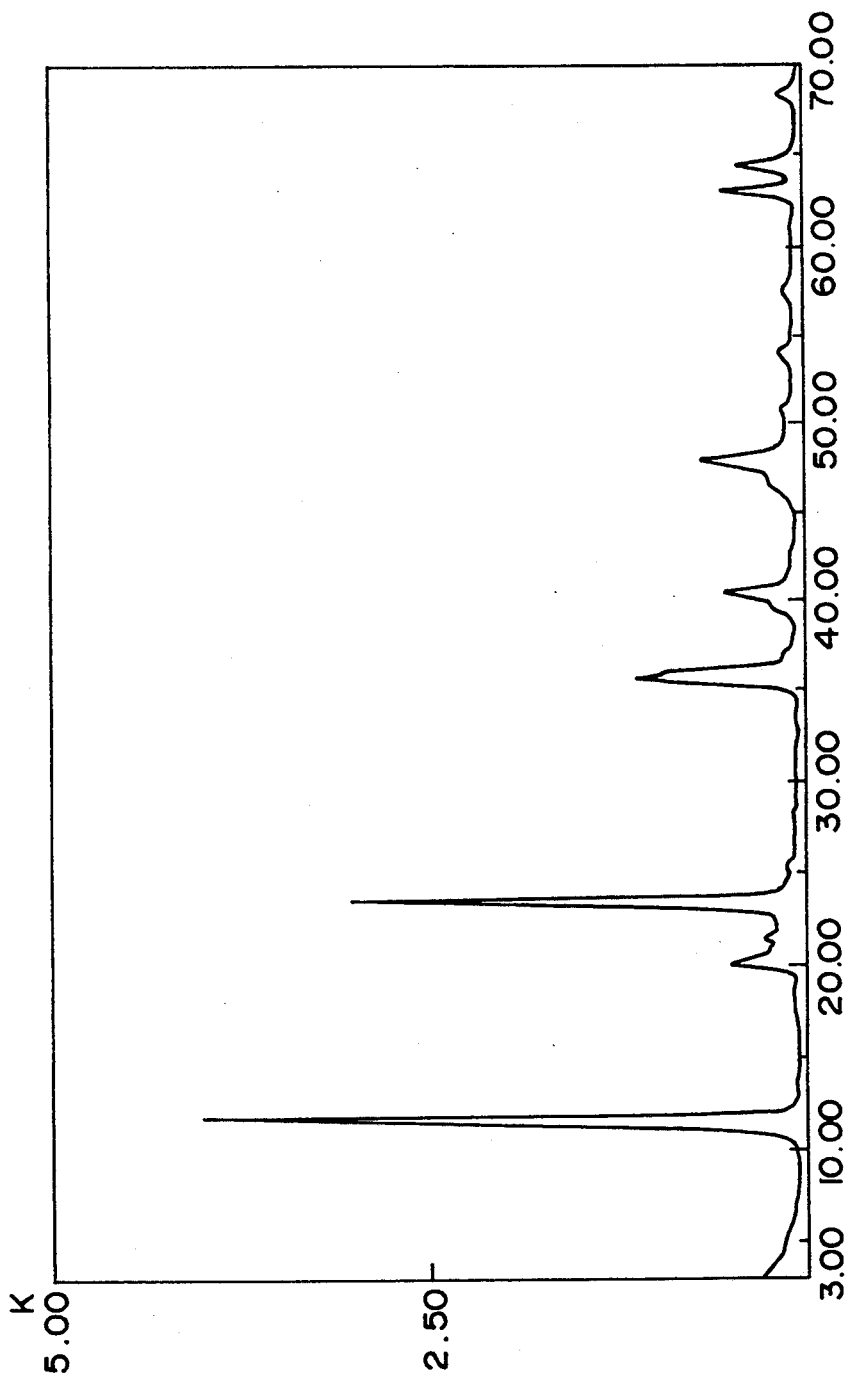
FIG. 6 is an X-ray diffraction pattern under Cu-Kα rays of LAHS (Sample No. H-5) obtained in Comparative Example 5.
Figure 21:
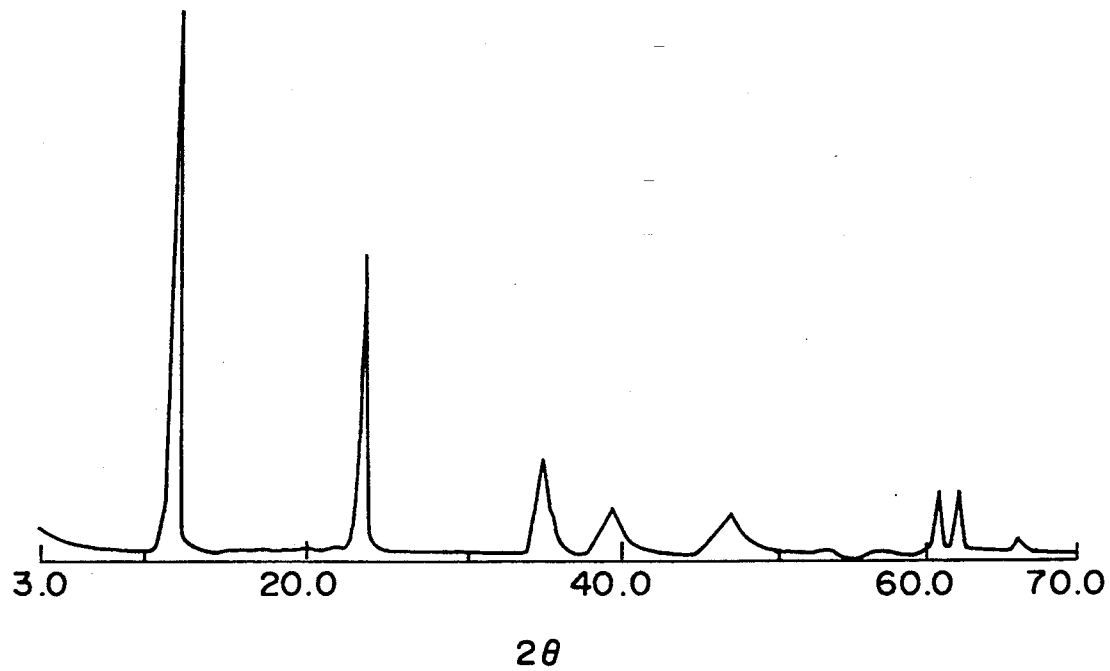
FIG. 21 is an X-ray diffraction pattern of hydrotalcite under Cu-Kα rays.

FIG. 1 of the accompanying drawings is an X-ray diffraction pattern of the lithium aluminum complex hydroxide salt (to be referred to as LAHS). FIG. 21 is an X-ray diffraction pattern of hydrotalcite. In LAHS, a diffraction peak with an index of a plane (100) appears at a spacing (d) of 4.3 Å to 4.5 Å. But this diffraction peak does not appear in hydrotalcite. Furthermore, in LAHS, diffraction peaks appear at multiples of 2 such as indices of planes (002), (004), (006), (008), etc. In contrast, hydrotalcite shows diffraction peaks at multiples of 3, for example, indices of planes (003), (006), (009), etc. Hence, they have different crystal structures.

In spite of containing a lithium ion, a 5% aqueous suspension of LAHS used in this invention shows a pH of about 8. Hydrotalcite under the same condition shows a pH of 9 to 9.5. The pH of LAHS is rather low, and shows a less tendency of damaging resins. The reason may be that hydrotalcite is composed of a brucite skeleton, whereas LAHS is composed of a gibbosity skeleton.

The LAHS of this invention, as shown below, is characterized in that when it is added to a chlorine-containing polymer, it has a longer thermal stability time than hydrotalcite. This fact suggests that LAHS used in this invention tends to have a high activity of capturing hydrogen chloride.

Figure 8:
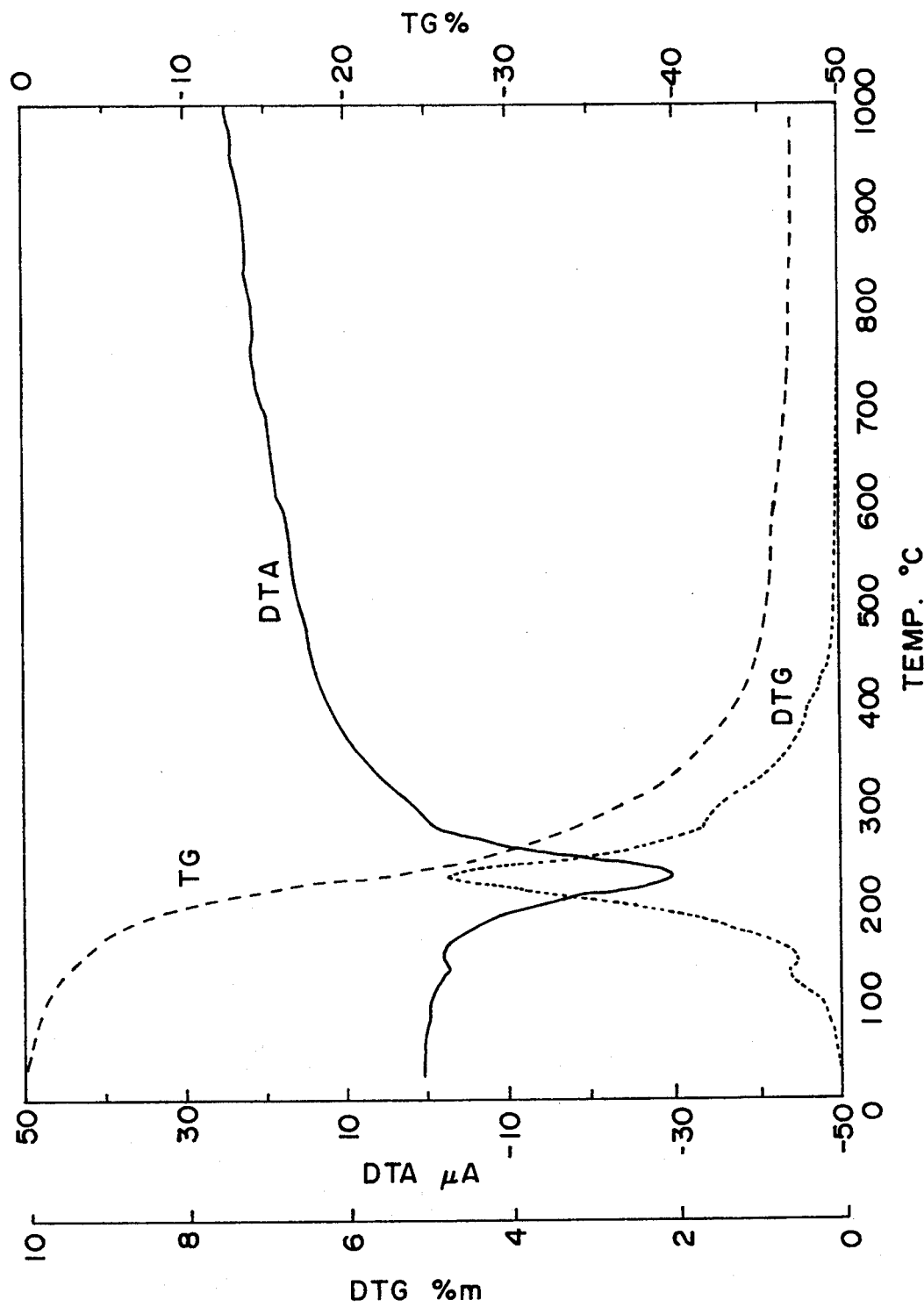
FIG. 8 is a differential thermal analysis curve of LAHS of Example 1.
Figure 22:
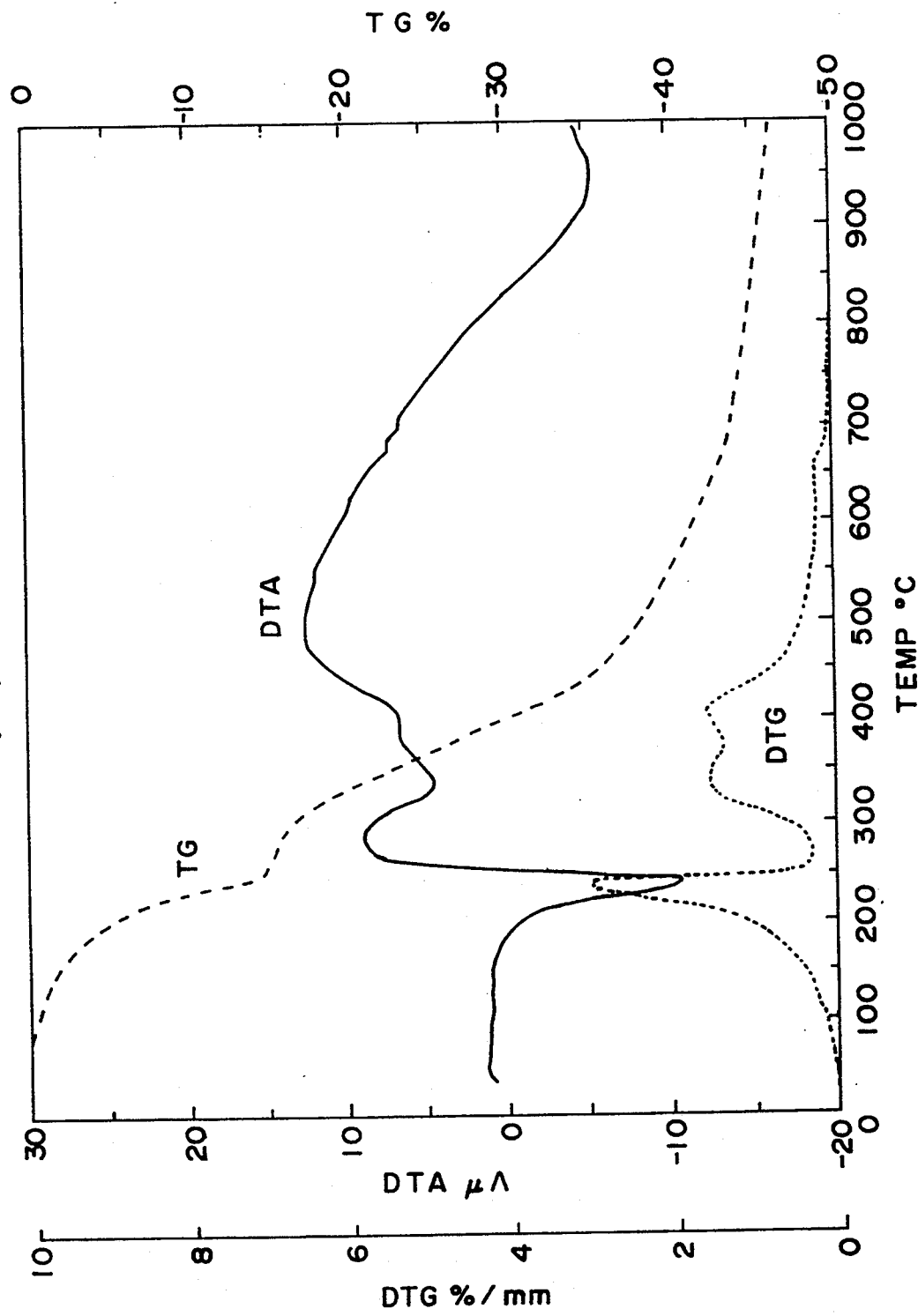
FIG. 22 is a differential thermal analysis curve of hydrotalcite.

FIG. 8 is a curve of differential thermal analysis (DTA) of LAHS of the invention. FIG. 22 is a DTA curve of hydrotalcite. In hydrotalcite, an endothermic peak based on the elimination of an interlayer water at 180° to 270° C., an endothermic peak based on the elimination of water of crystallization at 280° to 370° C. and an endothermic peak based on the elimination of a carbonate anion at 380° to 480° C. are observed. On the other hand, LAHS has an endothermic peak based on the elimination of an interlayer water and water of crystallization at 160° to 270° C., but a peak considered to be due to the elimination of a carbonate anion is at a lower temperature of 280° to 350° C.

This fact shows that in LAHS used in the the present invention, the elimination of the carbonic acid radical is carried out at a lower energy, and LAHS is easily activatable. That LAHS used in the present invention has excellent thermal stabilizing action is considered to relate to the above action and it simultaneously contains the hydroxy group of the gibbosity structure in a higher concentration. These advantages are achieved not only when LAHS is added to olefin-type resins containing catalyst residues.

Figure 7:
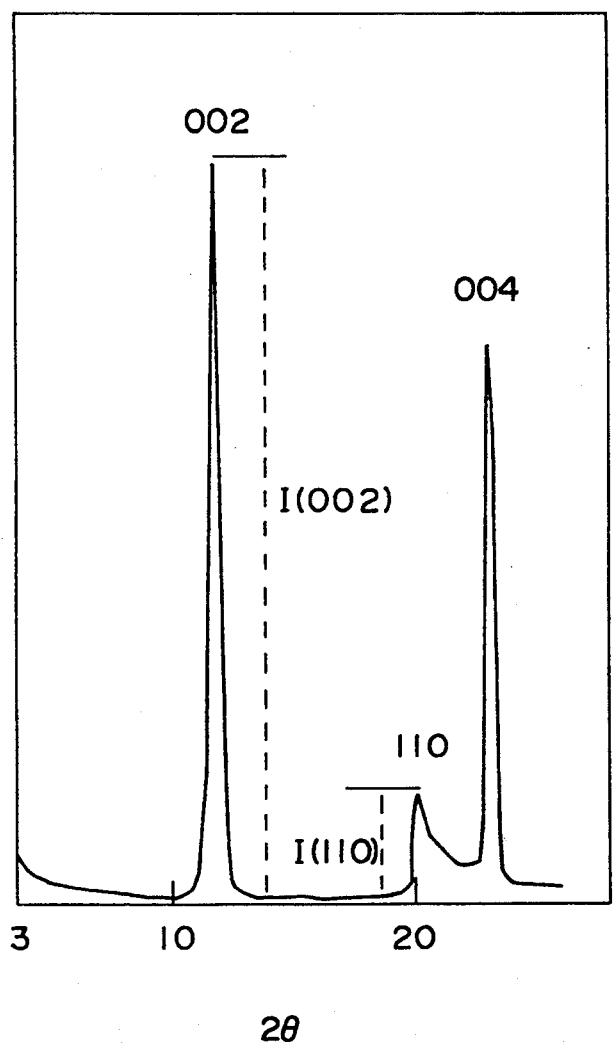
FIG. 7 is an explanatory view for explaining the calculation of an orientation degree from an X-ray diffraction pattern.

LAHS in accordance with the present invention is characterized in that the orientation degree defined by formula (2) is at least 10, especially as high as 20 to 50, and the orientation of the crystals to the 002 plane is developed markedly. In FIG. 7 for explaining the method of measuring the orientation degree OD, the diffraction relative intensity I (002) of the (002) plane and the diffraction relative intensity I (110) of the (110) plane in the X-ray diffraction pattern are found and the ratio of both is determined to be the orientation degree OD. This orientation degree expresses the degree of orientation of the (002) plane, that is, the degree of orientation of the plate-like surface of the hexagonal plate-like crystal.

In the thesis of Serna et al., the crystals of LAHS they obtained have a peak strength of the index of a plane (002) of 100, whereas the peak of the index of a plane (110) (this thesis describes a plane (101) but it is apparently an error for a plane (110)) is 15. The orientation degree is 6.67. Furthermore, according to the X-ray diffraction pattern of Sissoko et al., the orientation degree OD is about 4.7.

According to this invention, lithium carbonate is used as a raw material of lithium and aluminum chloride is used as a raw material of aluminum. When these materials are reacted in the presence of sodium carbonate and sodium hydroxide, and the reaction product is treated with a higher fatty acid, the orientation degree can be markedly increased.

In addition, according to this invention, by increasing the orientation degree to at least 10, when the product is used as a compounding agent for a resin, the dispersibility in the resin is increased and the transparency of the compounded resin composition is elevated, and furthermore, the capturability of chloride (halide ion) is further markedly increased. This becomes clear by referring to Table 1 to be mentioned below.

Please see Comparative Examples given later, Table 1, and FIGS. 1 to 6.

In Comparative Example 1 which shows a tracing experiment of Sissolo et al. and Comparative Example 2 which shows an improved experiment thereof, even when a combination of lithium hydroxide and aluminum chloride is used, only LAHS having an orientation degree of 6.4 or less is formed. As a result, its dipersibility in the resin is poor and the chloride capturing ability is not sufficient.

On the other hand, in Comparative Example 3 in which lithium chloride is reacted with aluminum chloride in the presence of an alkali carbonate and aluminum hydroxide, the orientation degree is still low, but in Comparative Example 4 in which in the above reaction, the reaction product is treated with a higher fatty acid in the final stage, the orientation degree is increased to 7.3. Moreover, the dispersibility and the chloride capturing property are somewhat increased.

In contrast, when in accordance with the present invention, lithium carbonate is reacted with aluminum chloride and in the final step of the reaction, the reaction product is treated with a higher fatty the orientation degree is increased to 47, as shown in Example 1 ( Sample No. 1 ), and dispersibility, transparency and chloride capturing property are markedly improved. The effect of treating the reaction product with the fatty acid becomes immediately clear by comparing Comparative Example 5 in which treatment with a fatty acid is not performed with Example 1.

In addition to the above advantages, particles of LAHS of this invention are characterized in that they are hexagonal plate-like crystals, have a constant particle shape and a uniform particle size. The primary particle size of the crystals by electron microscopic method is on the order of 0.05 to 0.6 $\mu$m, especially 0.1 to 0.4 $\mu$m. On the other hand, the secondary particle size measured by a Coulter counter method is on the order of 0.5 to 6 $\mu$m, especially 1 to 5 $\mu$m.

Figure 9:
FIGS. 9 and 10 are scanning-type electron microscopic photographs showing a particle structure of LAHS of Example 1 at magnifications of 10,000 times and 30,000 times.
Figure 10:
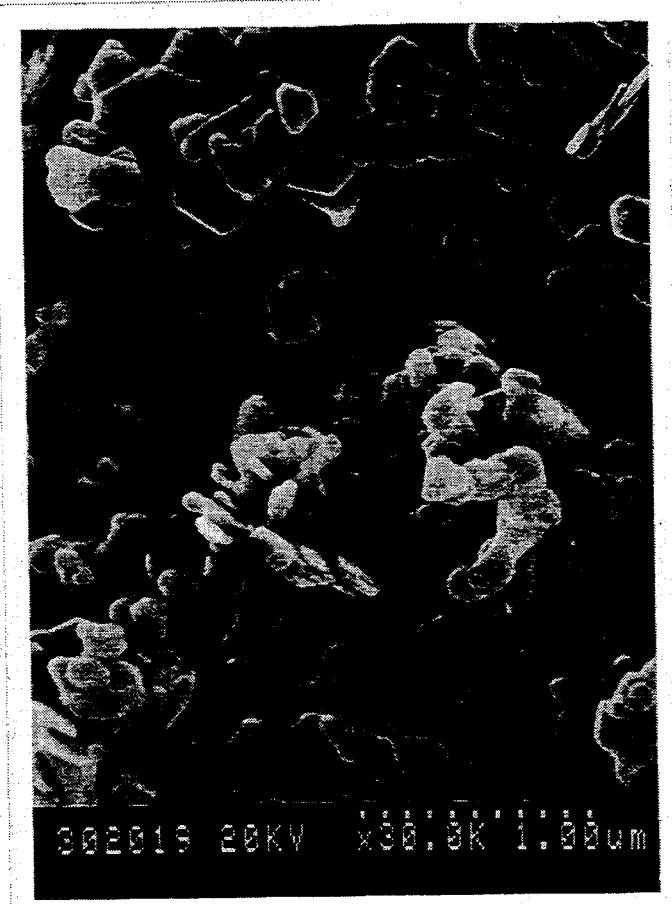

When FIGS. 9 and 10 are referred to, it is seen that in LAHS of this invention, the hexagonal plate-like primary particles agglomerate to form secondary particles so that the plate-like planes are parallel to each other, but when they are compounded with the resin, they are dispersed very finely (particularly in the form of primary particles) and are outstandingly excellent in respect of dispersibility.

Figure 11:
FIGS. 11 and 12 are scanning-type electron microscopic photographs showing a particle structure of LAHS of Comparative Example 1 at magnifications of 10,000 times and 30,000 times.
Figure 12:
Figure 13:
FIGS. 13 and 14 are scanning-type electron microscopic photographs showing a particle structure of LAHS of Comparative Example 2 at magnifications of 10,000 times and 30,000 times.
Figure 14:
Figure 15:
FIGS. 15 and 16 are scanning-type electron microscopic photographs showing a particle structure of LAHS of Comparative Example 3 at magnifications of 10,000 times and 30,000 times.
Figure 16:
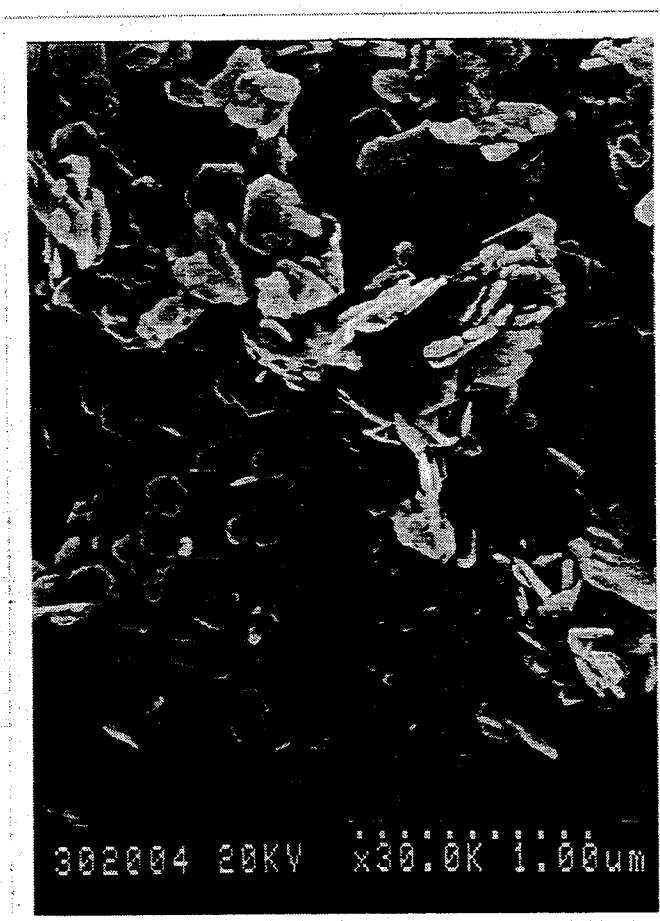
Figure 17:
FIGS. 17 and 18 are scanning-type electron microscopic photographs showing a particle structure of LAHS of Comparative Example 4 at magnifications of 10,000 times and 30,000 times.
Figure 18:
Figure 19:
FIGS. 19 and 20 are scanning-type electron microscopic photographs showing a particle structure of LAHS of Comparative Example 5 at magnifications of 10,000 times and 30,000 times.
Figure 20:
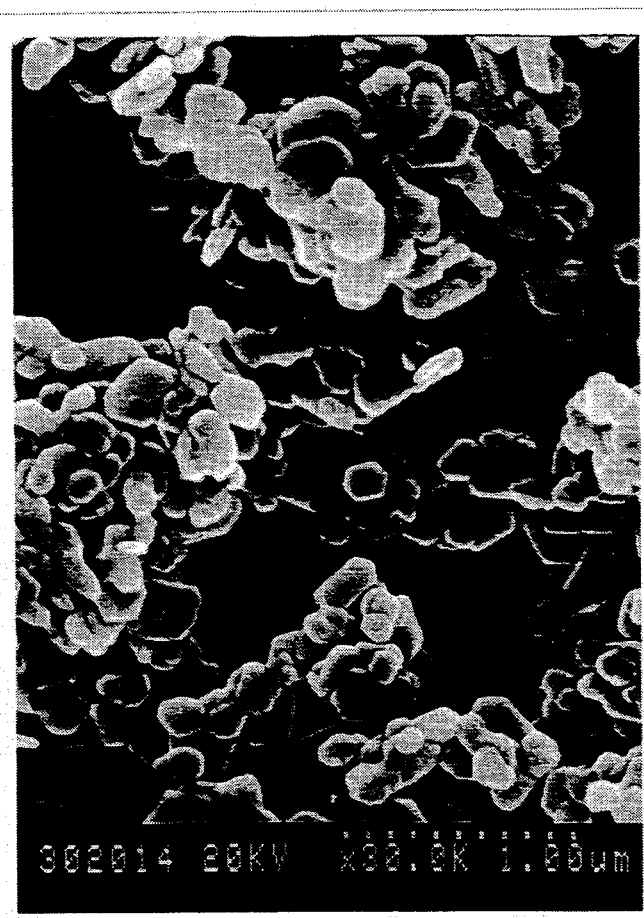

On the other hand, in FIGS. 11 and 12 (Comparative Example 1), FIGS. 13 and 14 (Comparative Example 2), FIGS. 15 and 16 (Comparative Example 3), and FIGS. 17 and 18 (Comparative Example 4), the growth of the crystals is insufficient and the particle sizes are irregular. When Comparative Example 5 in which treatment with a fatty acid is not performed (FIGS. 19 and 20) are compared with FIGS. 11 and 12, LAHS in accordance with this invention shows a large degree of primary particles, but there is a large difference in dispersbility between both. This is an unexpected fact.

By increasing the orientation degree of the LAHS of the invention to at least 10, the various marked characteristics are obtained when it is used as a compounding agent for poly(vinyl chloride). In the same way as using LAHS as above, it is an excellent compounding agent having excellent yellowing resistance and heat aging resistance of resin films in comparison with Comparative Examples (Samples Nos. H-2, H-3 and H-5) and hydrotalcite. This is clear by referring to Table 2 give below. The details of this are not known, but LAHS of this invention has better dispersion basically in the resin than LAHS of the Comparative Examples which has a low orientation degree.

LAHS of this invention has a bulk density of relatively as small as 0.1 to 0.25, and the secondary particles are considered to assume a relatively bulky structure. Furthermore, the BET specific surface area is in the range of 20 to 40 m$^2$/g.

According to this invention, lithium carbonate is reacted with aluminum chloride in the presence of sodium carbonate and sodium hydroxide in an aqueous medium.

These Al and Li components may be used so that the Al/Li atomic ratio becomes about 2 and that the CO$_3$/Li mole ratio becomes at least 0.5.

In performing the reaction, the alkaline agent may be added in an amount such that the pH of the solution after adding all components becomes 9.5 to 12, especially 10 to 11.5. The suitable reaction temperature may be from room temperature to 130° C. When the reaction temperature is low, the degree of crystallization is low. Hence, the reaction is desirably carried out at a temperature of at least 60° C., especially at least 80° C. Furthermore, by using an autoclave, etc., the product may be produced by a hydrothermal reaction. By a reaction at a high temperature, crystallization proceeds to a high degree to decrease the oil absorption amount and the specific surface area and tend to increase the apparent specific gravity. Generally, the sufficient reaction time is about 5 to 20 hours. The reaction may be carried out in two-steps consisting of a reaction at a low temperature of not more than 40° C. and a reaction at a high temperature of at least 80° C.

The crystals as formed contain about 0.5 to 3 moles (m) of water, but can be partly or completely dehydrated by heating and drying them at a temperature of not more than 300° C.

According to this invention, a higher fatty acid is added to the reaction mixture containing LAHS to treat LAHS with stirring. As the higher fatty acid, saturated or unsaturated fatty acids having 12 to 22 carbon atoms, especially 14 to 18 carbon atoms, may be used. Examples may include stearic acid, palmitic acid, lauric acid, oleic acid, coconut oil fatty acid, and palm oil fatty acid. As the fatty acids, mixed fatty acids such as beef tallow fatty acid and coconut oil fatty acid may be used. The amount of the fatty acid may be 0.5 to 10% by weight, especially 1 to 5% by weight, per LAHS.

There is no limitation to the treating conditions. Generally, the treatment may be performed with stirring at a temperature of 60° to 100° C. for a time of about 0.5 to 5 hours. The fatty acid used reacts with a sodium ion present in the reaction system, and is transferred into the aqueous phase in the form of a sodium soap. The surface treatment of LAHS formed proceeds.

After the treatment, the reaction mixture is subjected to a known solid-liquid separating operation such as filtration or centrifugal separation, washed sufficiently with water, dried, if required pulverized, and forming a product.

The resulting surface-treated LAHS can be used directly as a compounding agent for resins, but as required, may be after-treated by an organic or inorganic assistant. Examples of the organic assistant include silane coupling agents, aluminum coupling agents, titanium coupling agents, zirconium coupling agents, various waxes, and unmodified or modified various resins (such as rosin and petroleum resins) and etc. These coating agents may be used in an amount of 0.5 to 10% by weight, especially 1 to 5% by weight, based on LAHS.

As inorganic adjuvants, fixedly shaped particles composed of finely divided silica such as Aerosil and Aerosil subjected to a hydrophobic treatment, silicic acid salts such as calcium silicate and magnesium silicate, metal oxides such as calcia, magnesia and titania, metal hydroxides such as magnesium hydroxide and aluminum hydroxide, metal carbonates such as calcium carbonate, A-type or P-type synthetic zeolites, their acid-treated products and their metal ion-exchanged products may be blended with or powdered over LAHS.

Resin Composition

According to this invention, generally 0.01 to 10 parts by weight of LAHS, per 100 parts by weight of the resin to be stabilized, is compounded. The compounding amount is properly selected from the above range according to the type of the resin.

In one preferred embodiment of the invention, 0.1 to 10 parts by weight, especially 0.5 to 1.0 part by weight, of LAHS may be compounded in the chlorine-containing polymer per 100 parts by weight of the polymer.

Examples of the chlorine-containing polymers include polymers such as polyvinyl chloride, polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrne copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-propylene chloride copolymer, vinyl chloride-vinylidene chloride-vinyl acetate terpolymer, vinyl chloride-acrylate copolymers, vinyl chloride-maleate copolymers, vinyl chloride-methacrylate copolymers, vinyl chloride-acrylonitrile copolymer and internally plasticized polyvinyl chloride; and blends of the these chlorine-containing polymers and polyolefins such as α-olefin polymers, for example, polyethylene, polypropylene, polybutene, and poly-3-methylbutene, their copolymer such as ethylene-vinyl acetate copolymer and ethylene-propylene copolymer, polystyrene, acrylic resins, copolymers of styrene and other monomers (such as maleic anhydride, butadiene, or acrylonitrile), acrylonitrile-butadiene-styrene copolymer, acrylate-butadiene-styrene copolymers and methacrylate-butadiene-styrene copolymers.

In this case, 0.01 to 10 parts by weight of a zinc salt of a fatty acid and 0.01 to 10 parts by weight of a β-diketone or a β-keto-acid ester are desirably used conjointly per 100 parts by weight of the chlorine-containing polymer.

Examples of the zinc salt of the fatty acid are zinc stearate, zinc palmitate, and zinc laurate. The β-diketone and the β-keto-acid ester may be those known in the art, and may include 1,3-cyclohexadione, methylene-bis-1,3-cyclohexadione, 2-benzoyl-1, 3-cyclohexadione, acetyltetralone, palmitoyltetralone, stearoyltetralone, benzoyltetralone, -2acetylcyclohexanone, 2-benzoyl-cyclohexanone, 2-acetyl-1,3-cyclohexanediol, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, butanoylacetone, distearoylmethane, acetylacetone, stearoylacetone, bis(cyclohexanoyl)methane, and dipivaloylmethane.

Needless to say, the chlorine-containing polymer stabilizer in accordance with this invention may be used conjointly with known various additives, such as other stabilizers or stabilizer adjuvants, for example, non-metallic stabilizers, organic tin stabilizers, and basic inorganic acid salts, plasticizers, anti-oxidants, light stabilizers, nucleus-forming agents, fillers and epoxy stabilizers.

In another typical use of this invention, the stabilizer may be incorporated in order to prevent a deterioration of the olefin-type resin by the halogen-containing catalyst residues. The stabilizer used in this invention is desirably incorporated in an amount of 0.01 to 10 parts by weight per 100 parts by weight of the olefin-type resin. Examples of the olefin-type resin include polypropylene, low-, medium- or high density or linear low density polyethylene, crystalline propylene-ethylene copolymer, ionically cross-linked olefin copolymers, ethylene-vinyl acetate copolymer, and ethylene-acrylate copolymers.

The compounding agent of this invention may be incorporated in thermoplastic polyesters such as polyethylene terephthalate and polybutylene terephthalate, polyamides such as 6-nylon, 6,6-nylon and 6,8-bylon, and other thermoplastic resins such as polycarbonates, polysulfones and polyacetal to increase its stabilizing action, especially heat stability.

EXAMPLE 1

The process for preparing a LAHS of a fine powder of the lithium aluminum complex hydroxide salt having a high orientation degree (OD) of the invention will be described below.

(Production process for LAHS and its properties)

With stirring, 24.08 g of sodium hydroxide (NaOH content 96% ), 2.13 g of sodium carbonate ( $Na_2CO_3$ content 99.7%) and 3.73 g of lithium carbonate ($Li_2CO_3$ content 99%) were added to 2.3 liters of distilled water, and the mixture was heated to 40° C. Thereafter, an aqueous solution prepared by adding 49.78 g of aluminum chloride (20.48% as $Al_2O_3$) to 250 ml of distilled water was gradually poured to the above first aqueous solution so that the $CO_3/Li$ mole ratio became 0.7 and the Al/Li mole ratio became 2.0. The pH after pouring was 10.1. Furthermore, the solution was reacted at a temperature of 90° C. for 20 hours. After the end of the reaction, 1.1 g of stearic acid was added, and with stirring, a surface-treatment reaction was performed. The resulting reaction suspension was filtered, washed with water, dried at 70° C., and pulverized with a small-sized sample mill to form lithium aluminum complex hydroxide salt (sample No. 1).

Thereafter, the following properties were measured, and the results are shown in Table 1.

(Measuring Methods)

(1) X-ray diffraction

Using an RAD-IB system made by Rigaku Denki Co., Ltd., the diffraction was measured by using Cu-K$\alpha$.

| Target | Cu |
|---|---|
| Filter | curved crystal graphite monochlometer |
| Detector | SC |
| Voltage | 40 KVP |
| Current | 20 mA |
| Count full scale | 700 c/s |
| Smoothing point | 25 |
| Scanning speed | 1°/min. |
| Step sampling | 0.02° |
| Slit | DSI°Rs 0.15 mm SSI° |
| Glancing angle | 6° |

(2) Orientation degree (OD)

Orientation degree (OD) is defined by the following formula:

$$OD = I_{(002)}/I_{(110)}$$

wherein $I_{(002)}$ is a relative intensity of a peak in X-ray (u-K$\alpha$) diffraction pattern with an index of a peak in X-ray (u-K$\alpha$) diffraction pattern with an index of a plane (002) appearing at a spacing (d) of 7.67 Å to 7.84 Å and $I_{(110)}$ is a relative intensity of a peak in X-ray (Cu-K$\alpha$) diffraction pattern with an index of a plane (110) appearing at a spacing (d) of 4.41 Å to 4.45 Å.

(3) Average particle diameter

Using a particle size analyzer of laser diffraction system (Coulter ®LS130) made by Coulter Co., Ltd., the average particle diameter (median diameter; μm) was measured.

(4) Apparent specific gravity

Measured in accordance with JIS K-6220.

(5) Specific surface area

Using Sorptpmatic Series 1800 made by Carlo Erba Co., Ltd., it was measured by the BET method.

(6) Thermal analysis

Measurement was made by using an SS-5200 TG-DTA system made by Seiko Denshi Kogyo Co., Ltd. Measurement conditions included the use of $\alpha$-$Al_2O_3$ as a standard substance, a temperature elevation speed of 10° C./min. and the use of air as an atmosphere.

(7) Constants X and m

In accordance with the method of chemical analysis of lime by JIS R9011, Al/Li mole ratio was measured, and from a starting material according to 250° C. and 3 hours, m was calculated.

(evaluation by a PVC resin)

Thereafter, to evaluate the resulting sample (LAHS) as a resin stabilizer, a poly(vinyl chloride) sheet containing LAHS of the sample was prepared, and the dispersibility, chlorine capturing ability and the transparency of the sheet were measured by the following methods.

(8) Molding method (PVC sheet)

| (Compounding) | Parts by weight |
|---|---|
| Vinyl chloride resin (degree of polymerization: 1050) | 100 |
| Dioctyl phthalate | 50 |
| Zinc laurate | 0.3 |
| Dibenzoylmethane | 0.1 |
| Dihydroxydiphenylpropane | 0.2 |
| Sample | 1.4 |

(Molding method)

The above compounded composition was kneaded by a roll mill at 150° C. for 5 minutes to prepare a uniform mixture having a thickness of 0.5 min. Then, it was heated under pressure at 160° C. and 150 kg/cm for 5 minutes to prepare a plasticized vinyl chloride resin sheet having a thickness of 1 mm.

(9) Thermal stability (or chloride capturing property)

In accordance with JIS K-6723, the sample sheet was cut to a size of 1 mm × 1 mm, and 2 g of the sample chips were filled in a test tube containing a Congo Red paper. The test tube was heated to 180° C., and the HCl elimination time by the heat decomposition of the vinyl chloride resin was measured.

(10) Transparency

Using a photo-electric filter photometer (model 2C) made by irama Rika Kenkyujo, Kawasaki, Japan, the white light percent transmission of the sample sheet was measured.

(11) Dispersion Test

The dispersion of the molded sheet was visually evaluated.

The number of particles having a particle diameter of at least 40 μm (per mm$^2$) per unit area existing in the sample sheet in a restricted visual field image was found by using a binocular polarized microscope (Optiphot-Pol XTP) made by Nikon Co., Ltd.

(Evaluation by a polypropylene resin)

To confirm the yellowing preventing effect and rust preventing effect of polypropylene resins containing halogen-containing catalyst residues by the resin stabilizer of this invention, a polypropylene film was prepared by the following compounding and molding processes, and tested by the following methods.

(12) Molding process of polyolefin film

| (Compounding) | Parts by weight |
|---|---|
| Polypropylene resin *[1]) containing halogen-containing catalyst residues (homopolymer) | 100 |
| Sample | 0.04 |
| Antioxidant | 0.14 |
| Slipping agent | 0.3 |

*[1]): Having a melt flow rate of 13 g/10 min at 230° C., 2.16 kgs load

The above compounded composition was melt-kneaded at 210° C. by an extruder and was then pelletized.

The pellet was fed to an extruder and film of 50 to 60 μm in thickness was prepared by the inflation film forming method at a die temperature of 260° C.

The following physical properties of the obtained film were measured.

(13) Yellowing resistance test and thermal stability test

The molded film was placed in a constant-temperature constant-humidity box at 85° C. and 90% RH and allowed to stand for 24 days. The surface color of the molded sheet was measured by a Model 1001 DP color-difference meter made by Nihon Denshoku Kogyo K.K. An N value (degree of yellowness) was determined. As the N value is smaller, the yellowness resistance and the thermal stability are better.

Comparative Example 1

A manufacturing process for LAHS in accordance with Serva, et al., Clays and Clay Minerals, Vol. 30, No. 3, 180–184 (1982) (to be referred to as Ref. A) was described in detail in I. Sissolo, et al., Journal of Solid State Chemistry 60, 283–288 (1985) (to be referred to as Ref. B), a sample was prepared in the following manner to form Sample No. H-1 according to Ref. B.

In 1-liter glass beaker was put 600 ml of a mixed solution of 1.5M $LiOH \cdot H_2O$ and 0.08M $Na_2CO_3$, and with stirring at 250 rpm, 250 ml of a solution of 0.4M $AlCl_3 \cdot 6H_2O$ was added dropwise over the course of 45 minutes. The cited literature states that the pH changed from 13 to 10.2 at the end of the reaction. But in the present tracing experiment, the pH was initially 13 but was 13 at the end, and accordingly, there was no dropping in pH. After the end of addition, the mixture was stirred for one day and night at 50 rpm. As described in the literature, the product was hydrothermally reacted at 160° C. for 59 hours, filtered through a Buchner funnel, and washed sufficiently with distilled water until Cl was not detected with an aqueous solution of 3% $AgNO_3$. The resulting product was dried at 70° C. for 15 hours, and then pulverized with a small-size sample mill.

Comparative Example 2

With Sample No. H-1, the pH did not drop as mentioned above. Therefore, when 600 ml of a mixed solution composed of 200 ml of 1.5M $LiOH \cdot H_2O$ and 400 ml of 0.08M $Na_2CO_3$ was used, the pH dropped from 13 to 10.52 finally.

The product was a gel-like product which could not be filtered and separated like Sample No. H-1. Thereafter, the product was treated as in Sample No. H-1 and the final product was Sample No. H-2.

Comparative Example 3

In Comparative Example 4, the product was not treated with stearic acid after the reaction. The resulting LAHS was designated as Sample No. H-3.

Comparative Example 4

25.00 g of sodium hydroxide (NaOH content 96%) and 7.44 g of sodium carbonate ($Na_2CO_3$ content 99.7%) were added to 2 liters of distilled water with stirring, and the mixture was heated to 40° C.

Thereafter, an aqueous solution prepared by adding 4.33 g of lithium chloride (34.54 % as $Li_2O$) and 49.78 g of aluminum chloride (20.48% as $Al_2O_3$) to 500 ml of distilled water was poured to the first aqueous solution so that the $CO_3$/Li mole ratio became 2.0. The pH after pouring was 10.7. Furthermore, the solution was reacted at a temperature of 90° C. for 20 hours. After the end of the reaction, 1.1 g of stearic acid was added, and with stirring, a surface-treatment reaction was performed. The resulting reaction suspension was filtered, washed with water, dried at 70° C., and pulverized with a small size sample mill to form a lithium aluminum complex hydroxide salt (LAHS of sample No. H-4).

Comparative Example 5

In Example 1, LAHS which was not treated with stearic acid after the end of the reaction and was designated as Sample No. H-5.

TABLE 1

| Sample No. | Orientation degree | Average particle diameter (μm) | Apparent specific gravity (g/cm³) | Specific surface area (number/mm²) | Dispersibility (number/mm²) | Transparency (T %) | Chloride capturing property (minutes) |
|---|---|---|---|---|---|---|---|
| 1 | 47.1 | 3.9 | 0.119 | 22.4 | 1 | 85.0 | 82 |
| H-1 | 4.42 | 16.9 | 0.186 | 26.1 | 76 | 35.2 | 54 |
| H-2 | 6.37 | 0.5 | 0.176 | 27.1 | 17 | 77.7 | 23 |
| H-3 | 4.96 | 9.8 | 0.263 | 41.8 | 49 | 77.5 | 67 |
| H-4 | 7.29 | 5.3 | 0.155 | 34.5 | 5 | 83.0 | 73 |
| H-5 | 7.59 | 7.8 | 0.239 | 27.3 | 42 | 78.6 | 76 |

TABLE 2

| Sample No. | Yellowing resistance test (N value) | | Heat-aging test (N value) | |
| | One time pushing | three-time pushing | Initial | After 5 hours |
|---|---|---|---|---|
| 1 | 5.4 | 12.1 | 12.9 | 22.5 |
| H-2 | 7.3 | 15.4 | 15.4 | 30.4 |
| H-3 | 6.1 | 13.8 | 14.1 | 25.6 |
| H-5 | 5.8 | 13.1 | 13.6 | 24.8 |
| H-6*1 | 7.6 | 16.6 | 17.1 | 36.5 |

*1; Synthetic hydrotalcite

What we claim is:

1. A lithium aluminum complex hydroxide salt represented by the following formula $$(Al_2Li(OH)_6)_n X, mH_2O \qquad (1)$$

wherein X is a carbonate anion, n is a value number of anion X, and m is a number of not more than 3, and having an orientation degree (OD) of no less than 10, said orientation degree (OD) being defined by the following formula:

$$OD = I_{(022)}/I_{(110)}$$

wherein $I_{(002)}$ is a relative intensity of a peak in X-ray (u-Kα) diffraction pattern with an index of a plane (002) appearing at a spacing (d) of 7.67 Å to 7.84 Å and $I_{(110)}$ is a relative intensity of a peak in X-ray (Cu-Kα) diffraction pattern with an index of a plane (110) appearing at a spacing (d) of 4.41 Å to 4.45 Å.

2. The lithium aluminum complex hydroxide salt according to claim 1 wherein said salt has an orientation degree of 10 to 50.

3. The lithium aluminum complex hydroxide salt according to claim 1 wherein said salt is particles of a hexagonal plate crystal having a primary particle size of 0.05 to 0.6 μm.

4. The lithium aluminum complex hydroxide salt according to claim 1 wherein said salt has a bulk density of 0.1 to 0.25 g/cm$^3$ and a BET specific surface area of 20 to 40 m$^2$/g.

5. The lithium aluminum complex hydroxide salt according to claim 1 wherein said salt has an endothermic peak based on the elimination of an interlayer water and water of crystallization at 160° to 270° C. and an endothermic peak of 280° to 350° C. based on the elimination of a carbonate anion.

6. The lithium aluminum complex hydroxide salt according to claim 1 wherein said salt has an orientation degree of 20–50.

7. The lithium aluminum complex hydroxide salt according to claim 3 wherein said particles have a primary particle size of 0.1 to 0.4 μm.

8. A process for preparation of a lithium aluminum complex hydroxide salt which comprises reacting lithium carbonate with aluminum chloride in the presence of sodium carbonate and sodium hydroxide, and then carrying out a surface-treatment reaction by adding a higher fatty acid to the reaction mixture while stirring; said lithium aluminum complex hydroxide salt being represented by the following formula $$(Al_2Li(OH)_6)_n X, mH_2O \tag{1}$$

wherein X is a carbonate anion, n is a value number of anion X, and m is a number of not more than 3, and having an orientation degree (OD) of no less than 10, said orientation degree (OD) being defined by the following formula:

$$OD = I_{(002)}/I_{(110)}$$

wherein $I_{(002)}$ is a relative intensity of a peak in X-ray (u-Kα) diffraction pattern with an index of a plane (002) appearing at a spacing (d) of 7.67 Å to 7.84 Å and $I_{(110)}$ is a relative intensity of a peak in X-ray (Cu-Kα) diffraction pattern with an index of a plane (110) appearing at a spacing (d) of 4.41 Å to 4.45 Å.

9. A process for preparing a lithium aluminum complex hydroxide salt of the formula $(Al_2Li(OH)_6)_n X, mH_2O$, wherein X is a carbonate anion, n is a value of number of anion X, and m is a number of not more than 3, wherein said salt is in the form of particles having a primary particle size of from 0.05 to 0.6 μm and in the form of hexagonal plate crystals, said process comprising reacting lithium carbonate with aluminum chloride in the presence of sodium carbonate and sodium hydroxide in an aqueous medium in amounts such that the Al/Li atomic ratio is about 2 and the CO$_3$/Li mole ratio is at least 0.5, and the pH of the reaction mixture is in the range of from 9.5 to 12, said reaction being carried out at a temperature of from room temperature to 130° C., and surface-treating the resulting product by adding a higher fatty acid having from 12–22 carbon atoms in an amount of from 0.5 to 10% by weight, based on the amount of the lithium aluminum complex hydroxide salt, while stirring the reaction mixture.

10. The process of claim 9, wherein the step of reacting the lithium carbonate with aluminum chloride in the presence of sodium carbonate and sodium hydroxide is carried out at a temperature of at least 60° C.

11. The lithium aluminum complex hydroxide salt according to claim 1 which has been surface treated with a higher fatty acid having from 12 to 22 carbon atoms.

* * * * *